(12) United States Patent
Gonzui

(10) Patent No.: US 12,103,125 B2
(45) Date of Patent: Oct. 1, 2024

(54) HOLDER, CUTTING TOOL, AND METHOD FOR MANUFACTURING MACHINED PRODUCT

(71) Applicant: KYOCERA Corporation, Kyoto (JP)

(72) Inventor: Hirotoshi Gonzui, Moriyama (JP)

(73) Assignee: KYOCERA CORPORATION, Kyoto (JP)

( * ) Notice: Subject to any disclaimer, the term of this patent is extended or adjusted under 35 U.S.C. 154(b) by 665 days.

(21) Appl. No.: 17/312,390

(22) PCT Filed: Dec. 17, 2019

(86) PCT No.: PCT/JP2019/049336
§ 371 (c)(1),
(2) Date: Jun. 10, 2021

(87) PCT Pub. No.: WO2020/129957
PCT Pub. Date: Jun. 25, 2020

(65) Prior Publication Data
US 2022/0048149 A1     Feb. 17, 2022

(30) Foreign Application Priority Data

Dec. 18, 2018   (JP) ................................ 2018-235991

(51) Int. Cl.
*B23B 29/12*     (2006.01)
*B23B 27/00*     (2006.01)
(Continued)

(52) U.S. Cl.
CPC ........ *B23Q 11/0025* (2013.01); *B23B 27/002* (2013.01); *B23B 29/022* (2013.01); *F16F 15/02* (2013.01)

(58) Field of Classification Search
CPC ..... B23B 27/002; B23B 29/022; B23B 29/02; B23B 29/12; B23B 2229/00; B23B 2250/16
See application file for complete search history.

(56) References Cited

U.S. PATENT DOCUMENTS 3,164,041 A * 1/1965 Carlstedt ............... B23B 29/022
                                                              408/239 R
3,559,512 A * 9/1971 Aggarwal .................. F16F 7/10
                                                                188/322.5
(Continued)

FOREIGN PATENT DOCUMENTS

CN          106363198 A *  2/2017
JP          H379204 U      8/1991
(Continued)

OTHER PUBLICATIONS

English translation of CN 106363198 (Year: 2017).*

*Primary Examiner* — Alan Snyder
(74) *Attorney, Agent, or Firm* — HAUPTMAN HAM, LLP

(57) ABSTRACT

A holder in a non-limiting aspect of the present disclosure may include a base having a bar shape extended from a first end to a second end along a central axis, and a first weight having a column shape and a second weight having a column shape. The base may include a cavity extended along a central axis. The first weight may be located in the cavity. The second weight may be located in the cavity and located closer to the second end than the first weight.

19 Claims, 12 Drawing Sheets

(51) Int. Cl.
  *B23B 29/02*   (2006.01)
  *B23Q 11/00*   (2006.01)
  *F16F 15/02*   (2006.01)

(56) References Cited

U.S. PATENT DOCUMENTS

| | | | |
|---|---|---|---|
| 3,938,626 A * | 2/1976 | Hopkins | F16F 7/10 |
| | | | 408/143 |
| 2006/0275090 A1* | 12/2006 | Onozuka | B23B 29/022 |
| | | | 408/143 |
| 2010/0296889 A1 | 11/2010 | Lundblad et al. | |
| 2013/0206525 A1 | 8/2013 | Ogata | |
| 2017/0157683 A1* | 6/2017 | Nedzlek | B23B 27/002 |
| 2017/0197251 A1* | 7/2017 | Nakatani | F16F 15/08 |
| 2018/0154453 A1* | 6/2018 | Eichelberger | B23B 27/002 |

FOREIGN PATENT DOCUMENTS

| | | | |
|---|---|---|---|
| JP | 2008290219 A | 12/2008 | |
| JP | 2010269444 A | 12/2010 | |
| JP | 201257752 A | 3/2012 | |

* cited by examiner

HOLDER, CUTTING TOOL, AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2019/049336 filed on Dec. 17, 2019, which claims priority to Japanese Application No. 2018-235991 filed Dec. 18, 2018, which are entirely incorporated herein by reference.

TECHNICAL FIELD

The present disclosure may relate to a holder, a cutting tool, and a method for manufacturing a machined product.

BACKGROUND

Various holders including a vibration control mechanism have conventionally been proposed. A damping mechanism (vibration control mechanism) including weight members and an energizing member may be discussed in Japanese Unexamined Patent Publication No. 2012-57752 (Patent Document 1). A cylindrical hollow part formed in a shaft part (holder) may accommodate therein the weight members divided into a plurality of parts in a circumferential direction around a shaft center of the hollow part. The energizing member may carry out energization toward the shaft center so as to establish surface-to-surface contact between divided surfaces of the weight members adjacent to each other.

One purpose of the present disclosure may be to provide a holder including a vibration control mechanism making it easy to adjust weight, a cutting tool and a method for manufacturing a machined product.

SUMMARY

A holder in a non-limiting aspect of the present disclosure may include a base having a bar shape extended from a first end to a second end along a central axis, a first weight having a column shape extended from a first end part to a second end part, and a second weight having a column shape extended from a third end part to a fourth end part. The base may include a cavity located in the base and extended along a central axis. The first weight may be located in the cavity. The second weight may be located in the cavity and located closer to the second end than the first weight.

A cutting tool in an aspect may include the holder of the above aspect and a cutting insert attached to the holder.

A method for manufacturing a machined product in an aspect may include rotating at least one of the cutting tool of the above aspect and a workpiece, bringing the cutting tool into contact with the workpiece, and moving the cutting tool away from the workpiece.

EMBODIMENTS

<Holders>

Figure 1:
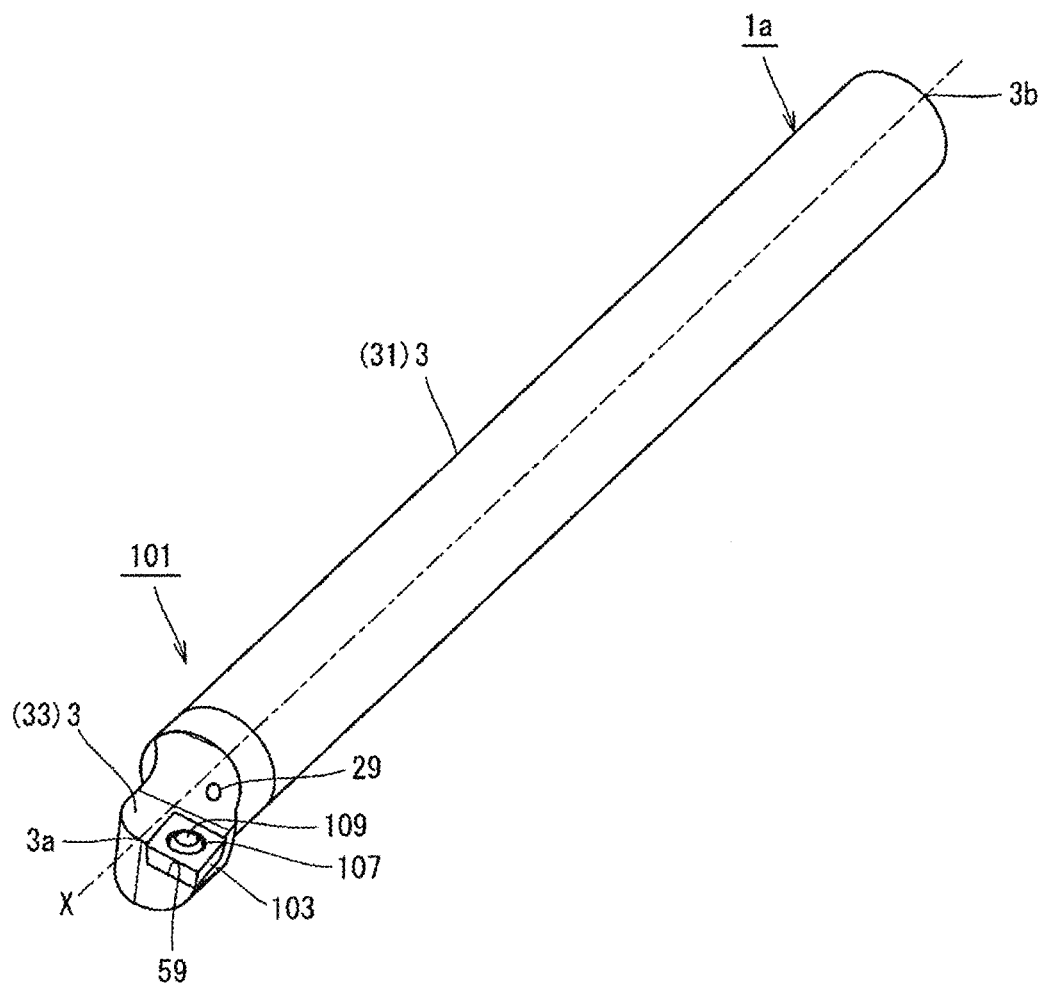
FIG. 1 is a perspective view illustrating a holder (cutting tool) in a non-limiting embodiment of the present disclosure.

The holders in non-limiting embodiments of the present disclosure may be individually described in detail below with reference to the drawings. For the sake of description, each of the drawings referred to in the following may illustrate, in a simplified form, only main members necessary for describing the embodiments. Hence, the holders may include any structural member not illustrated in the drawings referred to. Dimensions of the members in each of the drawings may not be ones which faithfully represent dimensions of actual structural members and dimension ratios of these members. These points may also be true for a cutting tool and a method for manufacturing a machined product described later.

Figure 2:
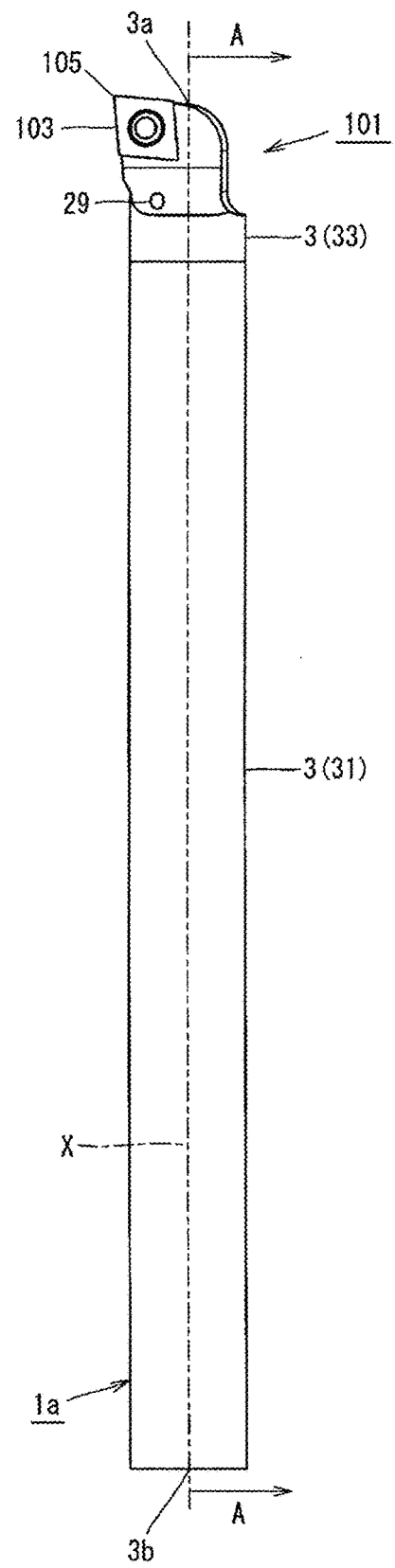
FIG. 2 is a side view of the holder illustrated in FIG. 1.
Figure 3:
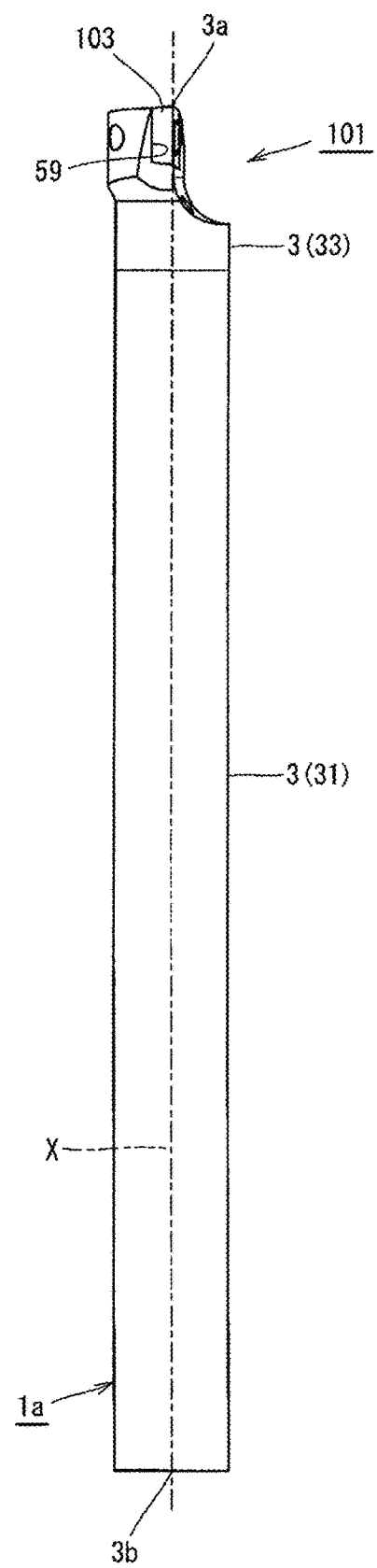
FIG. 3 is a side view of the holder illustrated in FIG. 1.

A holder 1a in a non-limiting embodiment illustrated in FIGS. 1 to 3 may be intended for a cutting tool, and may include a base 3 having a bar shape extended from a first end 3a to a second end 3b along a central axis X of the holder 1a. In general, the first end 3a may be called as "a front end", and the second end 3b may be called as "a rear end". The base 3 may have a structure extended from the first end 3a to the second end 3b, and may have, for example, a column shape or a polygonal prism shape. The base 3 may have the column shape in the non-limiting embodiment illustrated in FIGS. 1 to 3. Examples of material of the base 3 may include steel, cast iron and aluminum alloy.

Dimensions of the holder 1a may be suitably set according to dimensions of a workpiece. A length of the holder 1a in a direction along the central axis X may be set to, for example, approximately 60-3500 mm. A width (diameter) of the holder 1a in a direction orthogonal to the central axis X may be set to, for example, 6-250 mm.

Figure 4:
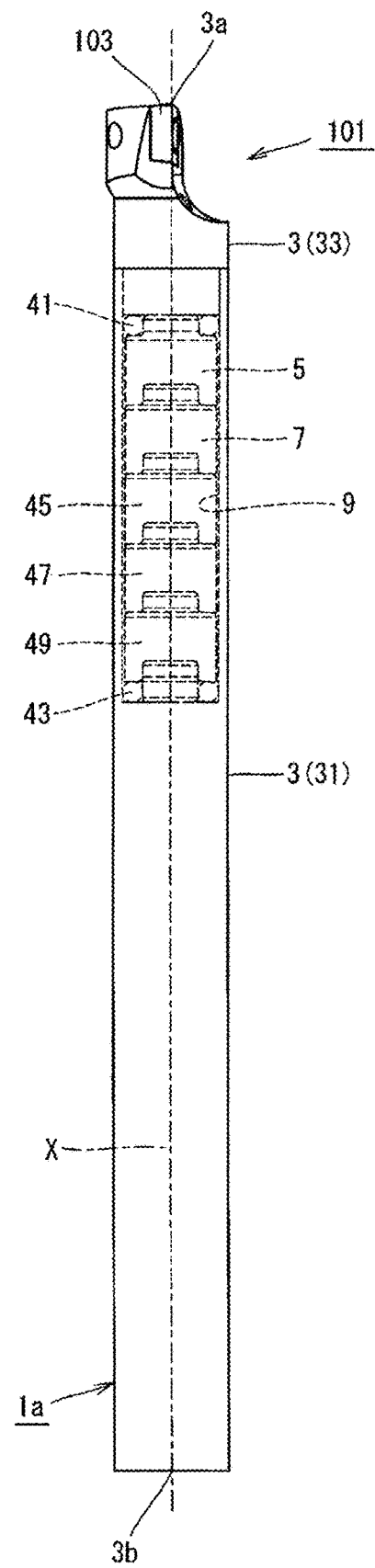
FIG. 4 is a perspective view of a weight or the like in the holder illustrated in FIG. 3.
Figure 5:
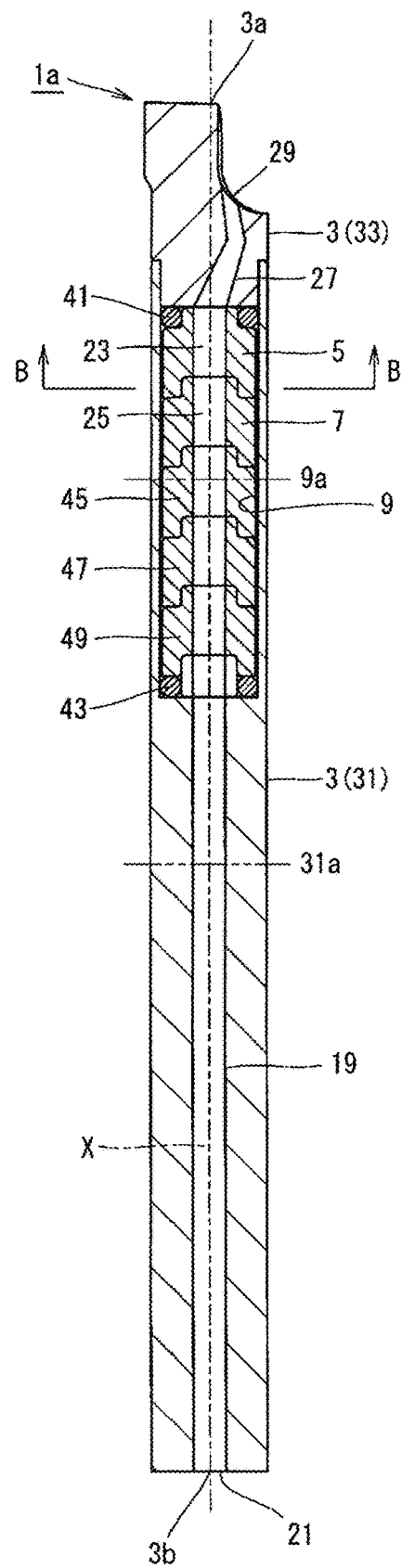
FIG. 5 is a sectional view taken along line A-A in the holder illustrated in FIG. 2.
Figure 9:
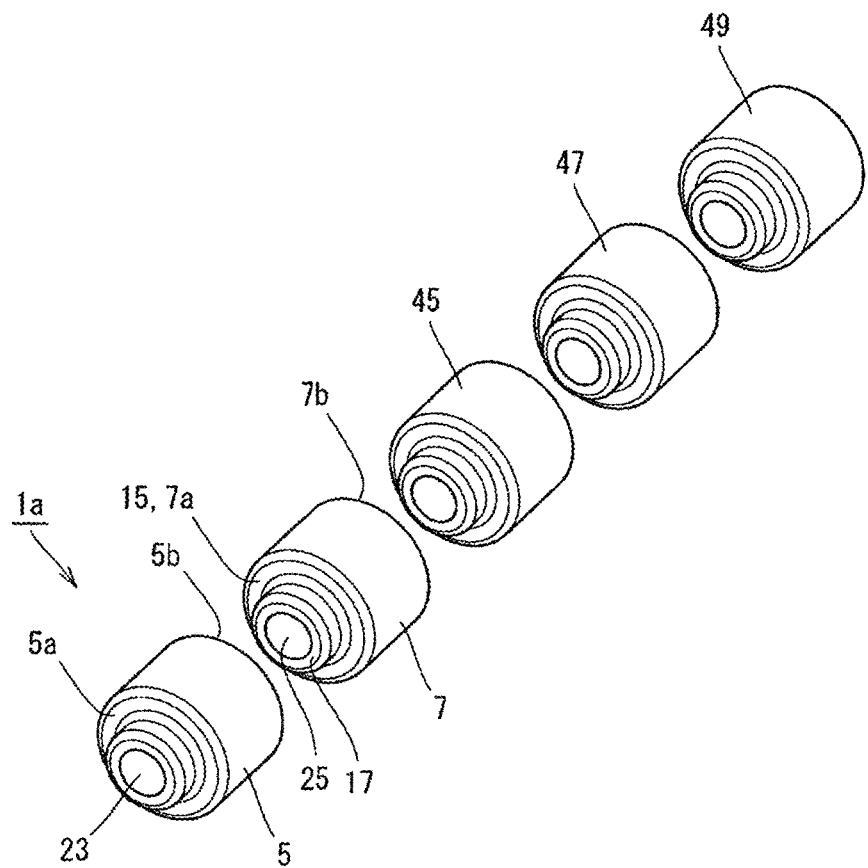
FIG. 9 is a perspective view illustrating the weight in the holder illustrated in FIG. 1.

A holder 1a in a non-limiting embodiment illustrated in FIGS. 4 and 5 may include a first weight 5 and a second weight 7. The first weight 5 may have a column shape extended from a first end part 5a to a second end part 5b, and the second weight 7 may have a column shape extended from a third end part 7a to a fourth end part 7b in a non-limiting embodiment illustrated in FIG. 6. As in the non-limiting embodiment illustrated in FIGS. 5 and 9, the first end part 5a may be located at an end portion on a side of the first end 3a in the first weight 5. The second end part 5b may be located at an end portion on a side of the second end 3b in the first weight 5. The third end part 7a may be located at an end portion on a side of the first end 3a in the second weight 7. The fourth end part 7b may be located at an end portion on a side of the second end 3b in the second weight 7. The first weight 5 and the second weight 7 may be servable as a vibration control member. Examples of material of the first weight 5 and the second weight 7 may include tungsten alloy, but there is no intention to limit thereto. A specific gravity of a material of the first weight 5 and the second weight 7 may be larger than a specific gravity of a material of the base 3.

Figure 8:
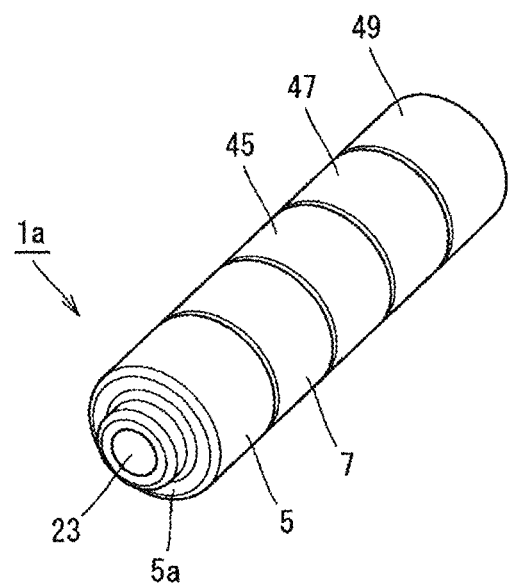
FIG. 8 is a perspective view illustrating the weight in the holder illustrated in FIG. 1.

The first weight 5 may be a structure extended from the first end part 5a to the second end part 5b, and may have, for example, a column shape or polygonal prism shape. This may also be true for the second weight 7. The first weight 5 and the second weight 7 may have the column shape in a non-limiting embodiment illustrated in FIGS. 8 and 9.

Figure 6:
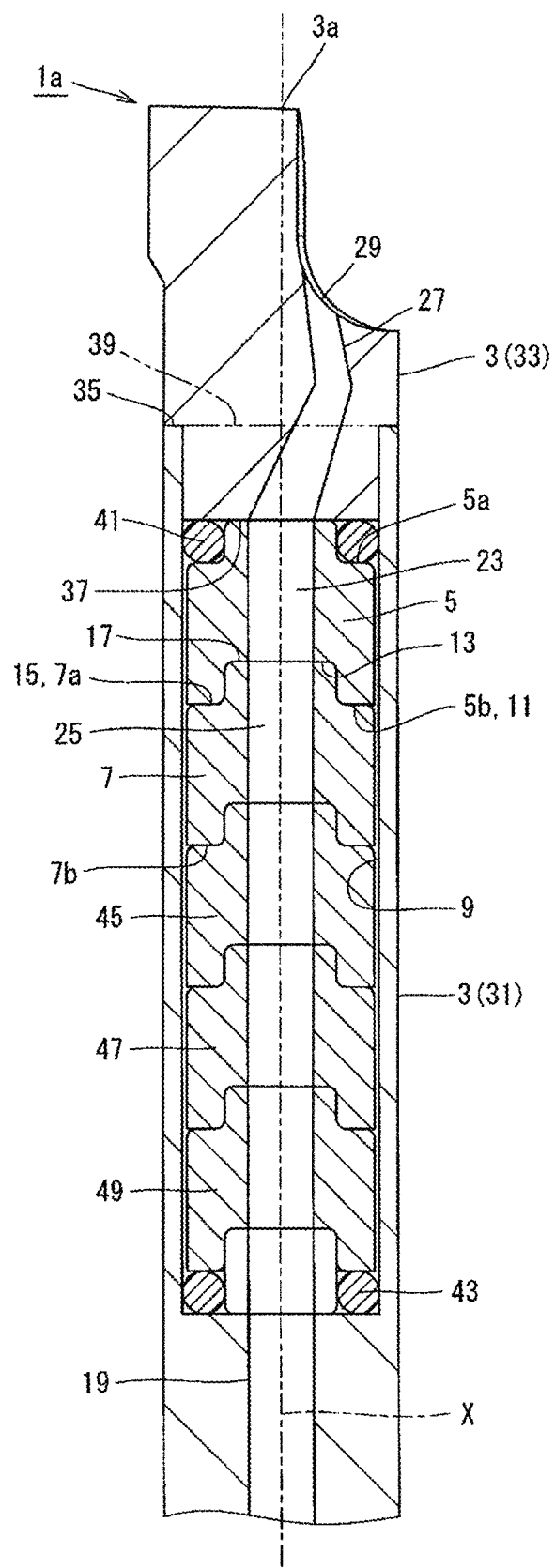
FIG. 6 is an enlarged view of a side of a first end in the holder illustrated in FIG. 5.

The base 3 may include a cavity 9 located in the base 3 and extended along the central axis X in the non-limiting embodiment illustrated in FIGS. 4 to 6. The first weight 5 may be located in the cavity 9, and the second weight 7 may be located in the cavity 9 and may be located closer to the second end 3b than the first weight 5 in the non-limiting embodiment illustrated in FIGS. 4 to 6. These configurations may make it easier for the first weight 5 and the second weight 7 to be attached to and detached from the holder 1a, thus leading to the vibration control mechanism that facilitates weight adjustment. It may therefore be easy to adjust the weight to an optimum weight for each holder 1a according to dimensions (diameter and length) of the holder 1a. Consequently, the holder 1a may be capable of offering adequate vibration control performance, and chatter vibration may be less likely to occur during a cutting process.

The cavity 9 may be extended along the central axis X so as to accommodate therein the first weight 5 and the second weight 7. The cavity 9 may have, for example, a cylindrical shape or polygonal cylindrical shape. The cavity 9 may have the cylindrical shape in the non-limiting embodiment illustrated in FIGS. 4 to 7.

The first weight 5 may include a first surface 11 opposed to the second weight 7, and a recess 13 located on the first surface 11 as in the non-limiting embodiment illustrated in FIG. 6. The second weight 7 may include a second surface 15 opposed to the first weight 5, and a protrusion 17 located on the second surface 15 as in the non-limiting embodiment illustrated in FIG. 6. If satisfying these configurations, a contact between the protrusion 17 and the recess 13 can be ensured, and the first weight 5 and the second weight 7 may therefore be not susceptible to dislocation in the cavity 9. In the non-limiting embodiment illustrated in FIG. 6, the first surface 11 may be a surface located on a side of the second end part 5b in the first weight 5, and the second surface 15 may be a surface located on a side of the third end part 7a in the second weight 7.

The protrusion 17 and the recess 13 may be brought into surface-to-surface contact with each other as in the non-limiting embodiment illustrated in FIG. 6. If satisfying this configuration, it may lead to higher vibration control performance. The protrusion 17 and the recess 13 may be engaged with each other in the non-limiting embodiment illustrated in FIG. 6. In other words, the protrusion 17 may be inserted into the recess 13 in the non-limiting embodiment illustrated in FIG. 6. Alternatively, the protrusion 17 may be wholly located in the recess 13 in the non-limiting embodiment illustrated in FIG. 6.

A surface of the first weight 5 which is located on a side of the first end part 5a may include a protrusion similar to that in the second weight 7 as in the non-limiting embodiment illustrated in FIG. 6. A surface of the second weight 7 which is located on a side of the fourth end part 7b may include a recess similar to that in the first weight 5. If satisfying these configurations, a position of the first weight 5 and a position of the second weight 7 in the cavity 9 can be reversed.

Figure 7:
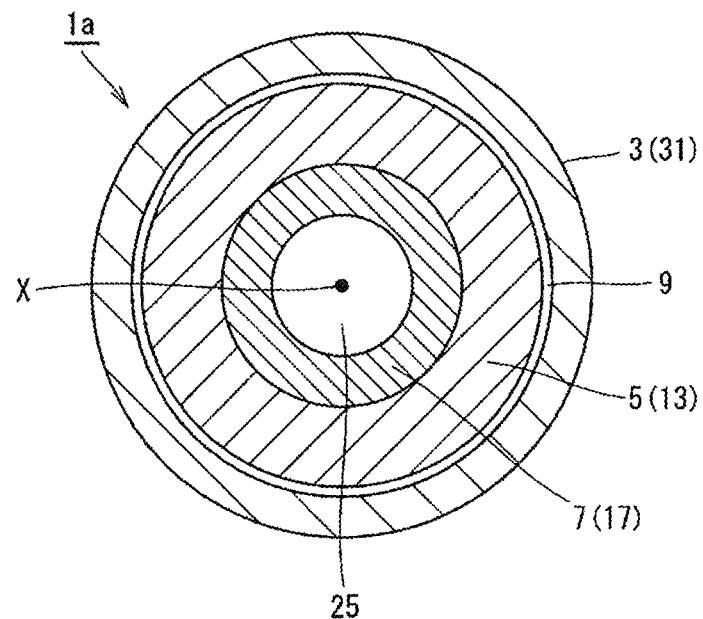
FIG. 7 is an enlarged view of a cross section taken along line B-B in the holder illustrated in FIG. 5.

The whole of the protrusion 17 may be located closer to the central axis X than the recess 13 in a cross section which passes through the protrusion 17 and the recess 13 and which is orthogonal to the central axis X as in the non-limiting embodiment illustrated in FIG. 7. If satisfying this configuration, the first weight 5 and the second weight 7 may be less likely to move in a direction orthogonal to the central axis X, and the first weight 5 and the second weight 7 may be less susceptible to dislocation in the cavity 9. The protrusion 17 and the recess 13 may be located so as to surround the central axis X in the above cross section as in the non-limiting embodiment illustrated in FIG. 7.

A weight of the first weight 5 may be equal to a weight of the second weight 7. If satisfying this configuration, it may be easy to control the first weight 5 and the second weight 7.

The weight of the first weight 5 may be different from the weight of the second weight 7. If satisfying this configuration, it may lead to a higher degree of freedom for weight adjustment in the holder 1a.

The first weight 5 and the second weight 7 may be located along the central axis X as in the non-limiting embodiment illustrated in FIG. 5. In this case, a length of the first weight 5 in the direction along the central axis X may be equal to a length of the second weight 7 in the direction along the central axis X. If satisfying this configuration, it may be easy to control the first weight 5 and the second weight 7.

Figure 10:
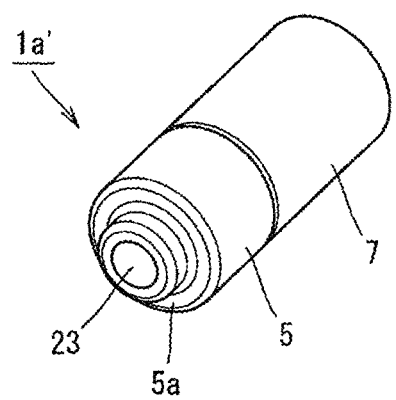
FIG. 10 is a perspective view illustrating a modification of the weight illustrated in FIG. 8.
Figure 11:
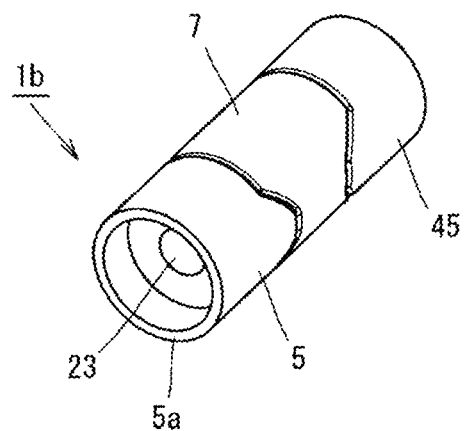
FIG. 11 is a perspective view illustrating a weight in a holder of a non-limiting embodiment of the present disclosure.
Figure 12:
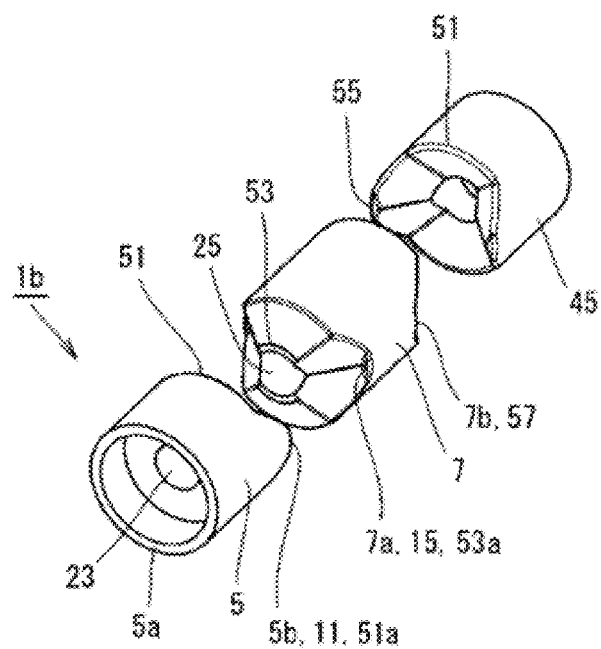
FIG. 12 is a perspective view illustrating a weight in a holder of a non-limiting embodiment of the present disclosure.
Figure 13:
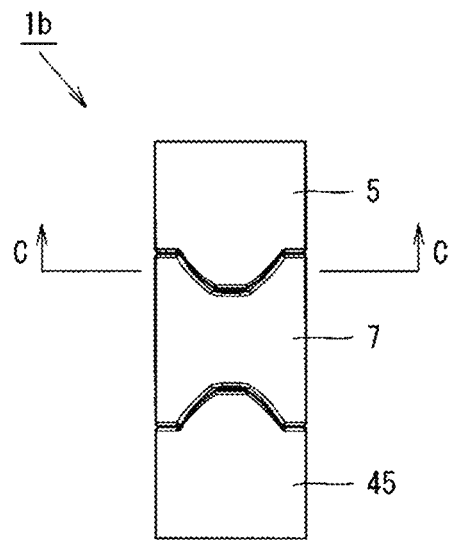
FIG. 13 is a side view of the weight illustrated in FIG. 11.
Figure 14:
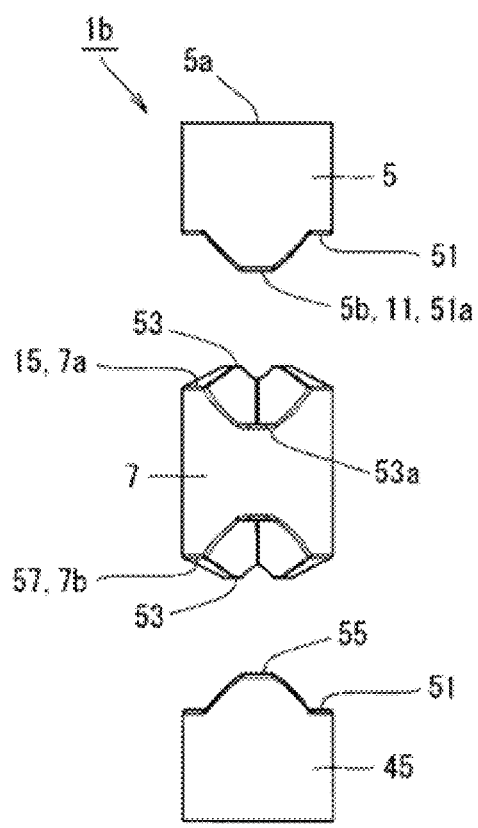
FIG. 14 is a side view of the weight illustrated in FIG. 12.

In cases where the first weight 5 and the second weight 7 are located along the central axis X as described above, the length of the first weight 5 in the direction along the central axis X may be different from the length of the second weight 7 in the direction along the central axis X as in a non-limiting embodiment illustrated in FIG. 10. The first weight 5 and the second weight 7 included in a holder 1a' in the non-limiting embodiment illustrated in FIG. 10 may be configured so that the length of the first weight 5 in the direction along the central axis X is smaller than the length of the second weight 7 in the direction along the central axis X. If satisfying this configuration, it may lead to a high degree of freedom for weight adjustment in the holder 1a'. Alternatively, the length of the first weight 5 in the direction along the central axis X may be larger than the length of the second weight 7 in the direction along the central axis X.

The base 3 may further include a first flow path 19 which may be located in the base 3 and extended along the central axis X, as in the non-limiting embodiment illustrated in FIG. 5. The first flow path 19 may be servable as a part that permits passage of a coolant during the cutting process. There is no particular limitation on the shape of the first flow path 19 as long as the first flow path 19 permits passage of the coolant. A cross section of the first flow path 19 orthogonal to a flow direction of the coolant may have a circular shape in the non-limiting embodiment illustrated in FIG. 5. Alternatively, the first flow path 19 in the cross section may have an elliptical shape or polygonal shape. An inner diameter of the first flow path 19 may be, for example, 1-10 mm. These points may also be true for a second flow path 27 described later.

The coolant may be composed of, for example, a water-insoluble cutting fluid or water-soluble cutting fluid, and the coolant may be suitably selected and used according to a material of a workpiece. Examples of the water-insoluble cutting fluid may include oil-based cutting fluids, inert extreme pressure-based cutting fluids and active extreme pressure-based cutting fluids. Examples of the water-soluble cutting fluid may include emulsion-type, soluble-type and solution-type cutting fluids. Alternatively, the coolant may be gas, such as inert gas, instead of liquid.

The first flow path 19 may include an inflow port 21 for the coolant in the non-limiting embodiment illustrated in FIG. 5. The inflow port 21 may be located at an end surface on a side of the second end 3b in the base 3 in the non-limiting embodiment illustrated in FIG. 5. However, the position of the inflow port 21 is not limited to the end surface, and the inflow port 21 may be located on, for example, an outer peripheral surface of the base 3.

The first flow path 19 may be extended in a straight line shape from the inflow port 21 toward a side of the first end 3a, or may connect to the cavity 9 in the non-limiting embodiment illustrated in FIG. 5. As in the non-limiting embodiment illustrated in FIGS. 5 and 6, the first weight 5 may further include a first through hole 23 that opens into the first end part 5a and the second end part 5b, and the second weight 7 may further include a second through hole 25 that opens into the third end part 7a and the fourth end part 7b. The first through hole 23 and the second through hole 25 may be located along the central axis X as in the non-limiting embodiment illustrated in FIGS. 5 and 6. If satisfying these configurations, the coolant supplied from the inflow port 21 to the first flow path 19 can be passed through the first through hole 23 and the second through hole 25 to a side of the first end 3a.

The holder 1a may further include a pipe inserted into the first through hole 23 and the second through hole 25. If satisfying this configuration, the coolant may be less likely to leak.

The holder 1a may further include the second flow path 27 extended from the cavity 9 to a side of the first end 3a as in the non-limiting embodiment illustrated in FIG. 5. The second flow path 27 may include an outflow port 29 for the coolant in the embodiment illustrated in FIG. 5. If satisfying these configurations, the coolant can be passed from the cavity 9 to the second flow path 27 so as to be sprayed from the outflow port 29. The outflow port 29 may be located on an outer peripheral surface on a side of the first end 3a in the base 3 in the non-limiting embodiment illustrated in FIG. 5. The position of the outflow port 29 is not limited to the outer peripheral surface, but may be located on an end surface on the side of the first end 3a in the base 3.

The base 3 may further include a first member 31 including the cavity 9, and a second member 33 located closer to the first end 3a than the first member 31 as in the non-limiting embodiment illustrated in FIGS. 4 to 6. The first member 31 may also be called as a shank, and may be a part held by a machine tool. The second member 33 may also be called as a head, and may be a part for fixing a cutting insert described later. If the first member 31 includes the cavity 9, it may be possible to ensure rigidity of the second member 33 susceptible to a strong impact during the cutting process. Alternatively, the first member 31 and the second member 33 may be configured attachably and detachably.

As in the non-limiting embodiment illustrated in FIG. 6, the first member 31 may further include a first end surface 35 located on a side of the first end 3a, and the second member 33 may further include a second end surface 37 located on a side of the second end 3b. The first end surface 35 and the second end surface 37 may be opposed to each other as in the non-limiting embodiment illustrated in FIG. 6. The cavity 9 may include an opening 39 that opens into the first end surface 35 as in the non-limiting embodiment illustrated in FIG. 6. If satisfying these configurations, the first weight 5 and the second weight 7 can be attached to and detached from the holder 1a through the opening 39.

A center (midportion) 9a of the cavity 9 in the direction along the central axis X may be located closer to the first end 3a than a center (midportion) of the first member 31 in the direction along the central axis X as in the non-limiting embodiment illustrated in FIG. 5. If satisfying this configuration, the cavity 9 constituting the vibration control mechanism may be located near the first end 3a susceptible to the strong impact during the cutting process, and therefore chatter vibration may be less likely to occur during the cutting process. Additionally, because it is possible to ensure rigidity of a part of the first member 31 which is located closer to the second end 3b than the center 31a, the part may be held by the machine tool. The whole of the cavity 9 may be located closer to the first end 3a than the center 31a in the non-limiting embodiment illustrated in FIG. 5.

The holder 1a may further include a lid to close the opening 39 of the cavity 9. If satisfying this configuration, it may be possible to prevent the first weight 5 and the second weight 7 from unintentionally getting out of the cavity 9. The second member 33 may be servable as the lid in the non-limiting embodiment illustrated in FIG. 6.

As in the non-limiting embodiment illustrated in FIGS. 4 to 6, the holder 1a may further include a first elastic member 41 located closer to the first end 3a than the first weight 5 in the cavity 9, and a second elastic member 43 located closer to the second end 3b than the second weight 7 in the cavity 9. If satisfying this configuration, the first weight 5 and the second weight 7 may be less prone to damage because if the first weight 5 and the second weight 7 move in the direction along the central axis X in the cavity 9, the first elastic member 41 and the second elastic member 43 absorb impact. Examples of material of the first elastic member 41 and the second elastic member 43 may include silicone rubber, without being limited thereto.

The first elastic member 41 and the second elastic member 43 may have, for example, a ring shape as long as both can be accommodated in the cavity 9. If the first elastic member 41 and the second elastic member 43 have the ring shape, it may be possible to allow the coolant to flow through the first elastic member 41 and the second elastic member 43. The first elastic member 41 and the second elastic member 43 may have a circular ring shape in the non-limiting embodiment illustrated in FIGS. 4 to 6. The first elastic member 41 and the second elastic member 43 may be the same or different in terms of configuration.

There may be a clearance between an inner peripheral surface of the base 3 in the cavity 9 and the first weight 5 and the second weight 7 as in the non-limiting embodiment illustrated in FIGS. 6 and 7. If satisfying this configuration, the first weight 5 and the second weight 7 may be less likely to come into contact with the inner peripheral surface of the base 3 in the cavity 9 even if the first weight 5 and the second weight 7 move in the direction orthogonal to the central axis X in the cavity 9. The first weight 5 and the second weight 7 may therefore be less prone to damage. The above clearance may be present in a state where the first weight 5 and the second weight 7 are sandwiched by the first elastic member 41 and the second elastic member 43 in the non-limiting embodiment illustrated in FIG. 6.

The holder 1a may further include other weight in addition to the first weight 5 and the second weight 7 as in the non-limiting embodiment illustrated in FIGS. 4 to 6 and FIGS. 8 and 9. If satisfying this configuration, it may lead to a higher degree of freedom for weight adjustment in the holder 1a. A single or a plurality of other weights may be included. In the non-limiting embodiments illustrated in FIGS. 4 to 6 and FIGS. 8 and 9, the holder 1a may further include a third weight 45, a fourth weight 47 and a fifth weight 49 in addition to the first weight 5 and the second weight 7. The third weight 45, the fourth weight 47 and the fifth weight 49 may be sequentially located on a side closer to the second end 3b than the second weight 7 in the cavity 9 in the non-limiting embodiment illustrated in FIGS. 4 to 6. Surfaces of the third weight 45, the fourth weight 47 and the fifth weight 49, which are respectively opposed to the weights adjacent to each other, may include the same configuration as the first weight 5 or the second weight 7. Because other configurations of these other weights are the same as those of the first weight 5 and the second weight 7, their descriptions may be omitted here.

A holder 1b in a non-limiting embodiment may be described below with reference to FIGS. 11 to 15. The following may mainly focus on points of difference from the holder 1a, and a detailed description of configurations similar to those of the holder 1a may be omitted in the following.

The holder 1b may include the first weight 5 and the second weight 7 in the non-limiting embodiment illustrated in FIGS. 11 to 15. The first weight 5 may include a first surface 11 opposed to the second weight 7, a protrusion 51a located on the first surface 11, and a recess 51 located on the first surface 11 in the non-limiting embodiment illustrated in FIGS. 12 and 14. The second weight 7 may include a second surface 15 opposed to the first weight 5, a recess 53a located on the second surface 15, and a protrusion 53 located on the second surface 15 in the non-limiting embodiment illustrated in FIGS. 12 and 14.

Figure 15:
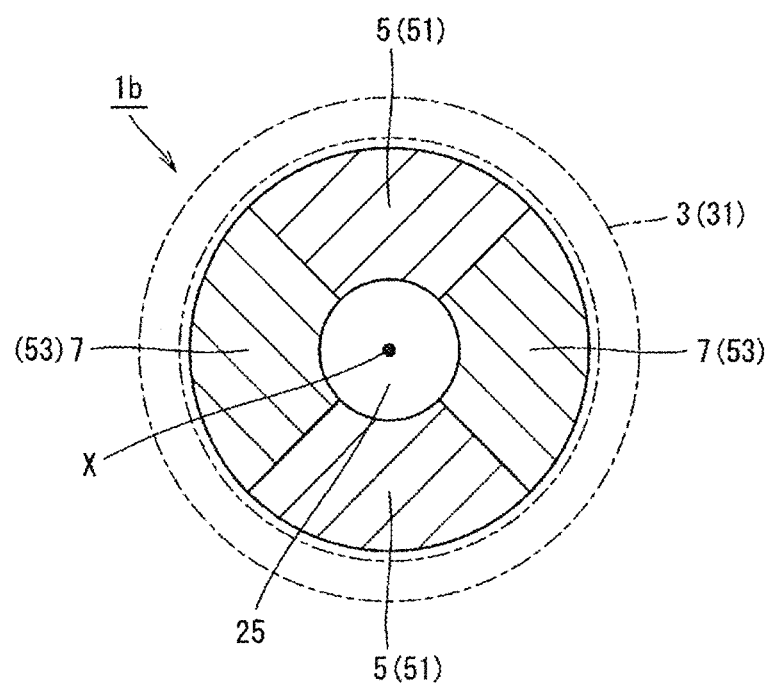
FIG. 15 is an enlarged view of a cross section taken along line C-C in the weight illustrated in FIG. 13, and corresponds to FIG. 7.

A part of the protrusion 53 may be located adjacent to a part of the recess 51 in a cross section which passes through the protrusion 53 and the recess 51 and which is orthogonal to the central axis X in the non-limiting embodiment illustrated in FIG. 15. In other words, the part of the protrusion 53 and the part of the recess 51 may be located alternatingly in the above cross section in the non-limiting embodiment illustrated in FIG. 15. If satisfying this configuration, a large contact area between the protrusion 53 and the recess 51 can be ensured to achieve improved vibration control performance. As in the non-limiting embodiment illustrated in FIG. 15, the part of the protrusion 53 and the part of the recess 51 may be located so as to have 90-degree rotation symmetry around the central axis X in the above cross section.

The holder 1b may further include a third weight 45 as in the non-limiting embodiment illustrated in FIGS. 11 to 14. If satisfying this configuration, it may lead to a high degree of freedom for weight adjustment in the holder 1b. The third weight 45 may have the same configuration as the first weight 5. The third weight 45 may include a third surface 55 opposed to the second weight 7, and a recess 51 located on the third surface 55 in the non-limiting embodiment illustrated in FIGS. 12 and 14. The second weight 7 may include a fourth surface 57 opposed to the third weight 45, and a protrusion 53 located on the fourth surface 57 in the non-limiting embodiment illustrated in FIGS. 12 and 14.

<Cutting Tool>

A cutting tool in a non-limiting embodiment may be described in detail below by illustrating the case of including the holder 1a with reference to FIGS. 1 to 4.

The cutting tool 101 may include the holder 1a and a cutting insert 103 attached to the holder 1a in the non-limiting embodiment illustrated in FIGS. 1 to 4. The cutting insert 103 may be simply referred to as the insert 103.

In the non-limiting embodiment illustrated in FIGS. 1 to 4, the cutting tool 101 may include the holder 1a capable of offering good vibration control performance, thereby offering excellent cutting performance.

The holder 1a may further include a pocket 59 located on a side of the first end 3a as in the non-limiting embodiment illustrated in FIGS. 1 and 3. The holder 1a may include the single pocket 59 in the non-limiting embodiment illustrated in FIGS. 1 and 3. The pocket 59 may be located at a portion where the insert 103 is located. Before attaching the insert 103, the pocket 59 may be a concaved portion on a side of the first end 3a in the holder 1a. The pocket 59 may be located in the second member 33 in the non-limiting embodiment illustrated in FIGS. 1 and 3.

The insert 103 may have a polygonal plate shape in the non-limiting embodiment illustrated in FIG. 1. However, the shape of the insert 103 is not limited to the polygonal plate shape.

The insert 103 may include a cutting edge 105 in the embodiment illustrated in FIG. 2. The insert 103 may be located in the pocket 59 so that the cutting edge 105 protrudes sidewards on a side of the first end 3a of the holder 1a in the non-limiting embodiment illustrated in FIG. 2. The cutting tool 101 may be capable of carrying out a cutting process by bringing the cutting edge 105 into contact with a workpiece. The cutting edge 105 may be located most away from the central axis X on a side of the first end 3a of the base 3 in the non-limiting embodiment illustrated in FIG. 2. If the cutting edge 105 protrudes sideward as described above, it may become possible to bring only a portion near the cutting edge 105 into contact with the workpiece.

The insert 103 may further include a through hole 107 in the non-limiting embodiment illustrated in FIG. 1. The cutting tool 101 may further include a fixing member 109 in the non-limiting embodiment illustrated in FIG. 1. The fixing member 109 may be a member for fixing the insert 103 to the holder 1a. The fixing member 109 may be a screw 109 in the non-limiting embodiment illustrated in FIG. 1. The fixing member 109 may be, for example, a clamping member instead of the screw 109 in the non-limiting embodiment illustrated in FIG. 1.

The insert 103 may include the through hole 107 as described above, and the holder 1a may include a screw hole at a position corresponding to the through hole 107 in the non-limiting embodiment illustrated in FIG. 1. The insert 103 may be fixable to the holder 1a by inserting the screw 109 into the through hole 107 of the insert 103, and by fixing the screw 109 in the screw hole of the holder 1a. The through hole 107 and the screw hole may be extended in the direction orthogonal to the central axis X in the non-limiting embodiment illustrated in FIG. 1.

For example, cemented carbide or cermet may be usable as a material of the insert 103. Examples of composition of the cemented carbide may include WC—Co, WC—TiC—Co and WC—TiC—TaC—Co. The WC—Co may be produced by adding cobalt (Co) powder to tungsten carbide (WC), followed by sintering. The WC—TiC—Co may be produced by adding titanium carbide (TiC) to WC—Co. The WC—TiC—TaC—Co may be produced by adding tantalum carbide (TaC) to WC—TiC—Co.

The cermet may be a sintered composite material obtainable by compositing metal into a ceramic ingredient. Examples of the cermet may include ones which are composed mainly of a titanium compound, such as titanium carbide (TiC) or titanium nitride (TiN).

Although the cutting tool 101 includes the holder 1a in the non-limiting embodiment illustrated in FIGS. 1 to 4, there is no intention to limit thereto. For example, the cutting tool 101 may include the holder 1b.

<Method for Manufacturing Machined Product>

A method for manufacturing a machined product 203 in a non-limiting embodiment may be described in detail below with reference to FIGS. 16 to 18. Although the cutting tool 101 including the holder 1a is used in the non-limiting embodiment illustrated in FIGS. 16 to 18, there is no intention to limit thereto. For example, the cutting tool 101 including the holder 1b may be used.

Figure 16:
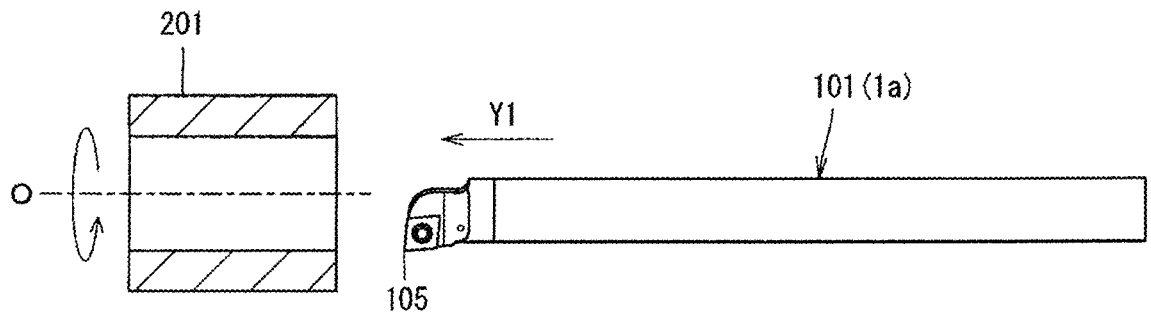
FIG. 16 is a schematic diagram illustrating one of steps in a method for manufacturing a machined product in a non-limiting embodiment of the present disclosure.
Figure 17:
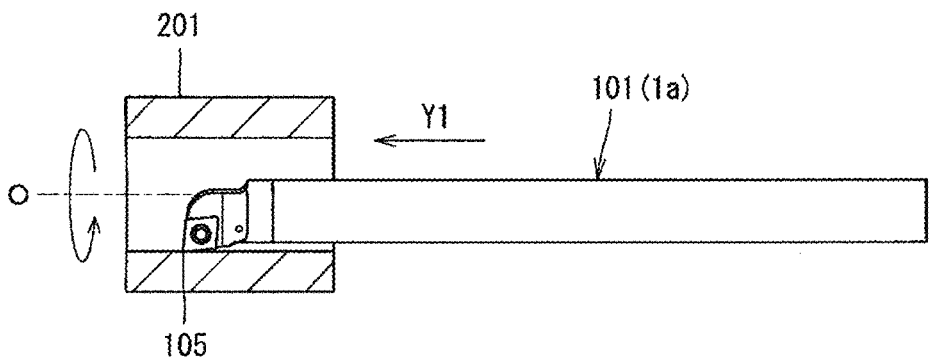
FIG. 17 is a schematic diagram illustrating one of the steps in the method for manufacturing a machined product in the non-limiting embodiment of the present disclosure.

The method for manufacturing the machined product 203 in the non-limiting embodiment may include the following steps (1) to (4):

(1) preparing a workpiece 201 and the cutting tool 101 as in the non-limiting embodiment illustrated in FIG. 16;
(2) rotating the workpiece 201;
(3) causing the workpiece 201 and the cutting tool 101 to come into contact with each other as in the non-limiting embodiment illustrated in FIG. 17; and
(4) causing the workpiece 201 and the cutting tool 101 to move away from each other as in the non-limiting embodiment illustrated in FIG. 18.

Specifically, examples of material of the workpiece 201 prepared in the step (1) may include carbon steel, alloy steel, stainless steel, cast iron and nonferrous metals. Alternatively, the above cutting tool 101 may be prepared in the step (1) in the non-limiting embodiment illustrated in FIG. 16.

In the step (2), the workpiece 201 may be rotated around a rotation axis O as in the embodiment illustrated in FIG. 16.

In the step (3), firstly, the cutting tool 101 may be relatively brought near the workpiece 201 being rotated by moving the cutting tool 101 in an arrow direction Y1. Subsequently, the cutting tool 101 may be brought into contact with the workpiece 201 being rotated as in the non-limiting embodiment illustrated in FIG. 17. The workpiece 201 may be cut out by bringing the cutting edge 105 of the cutting tool 101 into contact with the workpiece 201 in the non-limiting embodiment illustrated in FIG. 17.

Figure 18:
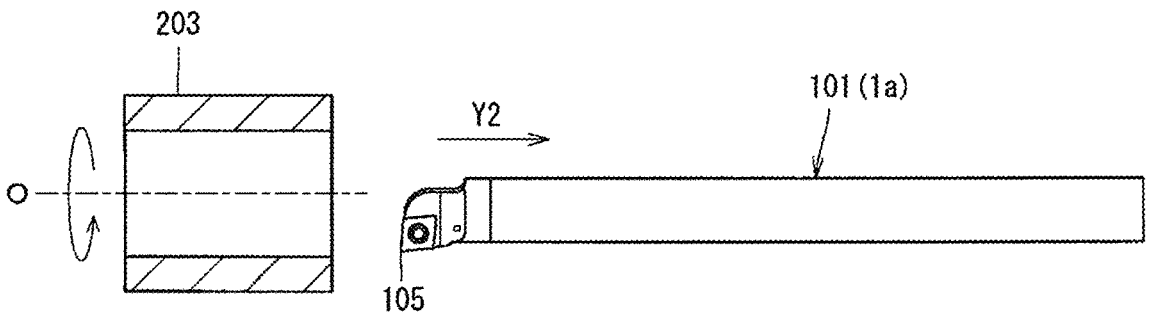
FIG. 18 is a schematic diagram illustrating one of the steps in the method for manufacturing a machined product in the non-limiting embodiment of the present disclosure.

In the step (4), the cutting tool 101 may be moved away from the workpiece 201 to obtain the machined product 203 by moving the cutting tool 101 in an arrow direction Y2 as in the non-limiting embodiment illustrated in FIG. 18.

With the method for manufacturing the machined product 203 in the non-limiting embodiment, the workpiece 201 can be cut out with high machining accuracy while reducing the occurrence of chatter vibration because the method uses the cutting tool 101 including the holder 1a capable of offering the good vibration control performance. It may be consequently possible to obtain the machined product 203 having a highly accurate machined surface.

Alternatively, the workpiece 201 may be brought near the cutting tool 110 in the step (3), and the workpiece 201 may be moved away from the cutting tool 101 in the step (4). If the cutting process is continued, it may be necessary to repeat the step of bringing the cutting edge 105 into contact with different portions of the workpiece 201, while the workpiece 201 is kept rotating.

While the holders 1a and 1b, the cutting tool 101 and the method for manufacturing the machined product 203 in the non-limiting embodiments of the present disclosure have been illustrated and described above, the present disclosure is not limited to the above embodiments. It may, of course, be possible to make any arbitrary ones insofar as they do not depart from the gist of the present disclosure.

For example, the recess 13 of the first weight 5 and the protrusion 17 of the second weight 7 in the holder 1a may be reversed in the above non-limiting embodiments. Specifically, instead of the configuration that the first weight 5 includes the recess 13 and the second weight 7 includes the protrusion 17 in the holder 1a, the first weight 5 may include the protrusion 17 and the second weight 7 may include the recess 13 in the holder 1a. This may also be true for the recess 51 of the first weight 5 and the protrusion 53 of the second weight 7 in the holder 1b.

Alternatively, the first weight 5 may not include the recess 13 (recess 51), and the second weight 7 may not include the protrusion 17 (protrusion 53) in the above non-limiting embodiments. In these cases, the first surface 11 and the second surface 15 may be a flat surface.

Although the cutting tool 101 is a turning tool, the cutting tool 101 may be made into a rotating tool or the like. If the cutting tool 101 is made into the rotating tool, the cutting tool 101 may be rotated in the step (2) in the method for manufacturing the machined product 203.

The invention claimed is:

1. A holder, comprising:
  a base having a bar shape extended from a first end to a second end along a central axis of the holder;
  a first weight having a column shape extended from a first end part to a second end part; and
  a second weight having a column shape extended from a third end part to a fourth end part, wherein
  the base comprises a cavity located in the base and extended along the central axis,
  the first weight is located in the cavity, and comprises
    a first surface facing the second weight,
    first protrusions located on the first surface, and
    first recesses located on the first surface,
  the second weight is located in the cavity and located closer to the second end than the first weight, and comprises
    a second surface facing the first weight,
    second protrusions located on the second surface, and
    second recesses located on the second surface,
  the first protrusions face the second recesses,
  the second protrusions face the first recesses, and
  in a cross section crossing the first protrusions and the second protrusions and orthogonal to the central axis, the first protrusions and the second protrusions are located alternatingly in a circumferential direction of the holder.

2. The holder according to claim 1, wherein
  a weight of the first weight is equal to a weight of the second weight.

3. The holder according to claim 1, wherein
  a weight of the first weight is different from a weight of the second weight.

4. The holder according to claim 1, wherein
the first weight and the second weight are located along the central axis, and
a length of the first weight in a direction along the central axis is equal to a length of the second weight in the direction along the central axis.

5. The holder according to claim 1, wherein
the first weight and the second weight are located along the central axis, and
a length of the first weight in a direction along the central axis is different from a length of the second weight in the direction along the central axis.

6. The holder according to claim 1, wherein
the base further comprises a flow path located in the base and extended along the central axis,
the flow path connects to the cavity,
the first weight further comprises a first through hole that opens into the first end part and the second end part,
the second weight further comprises a second through hole that opens into the third end part and the fourth end part, and
the first through hole and the second through hole are located along the central axis.

7. The holder according to claim 1, wherein
the base further comprises
a first member comprising the cavity, and
a second member located closer to the first end than the first member,
the first member further comprises a first end surface located on a side of the first end,
the second member comprises a second end surface located on a side of the second end,
the first end surface and the second end surface are opposed to each other, and
the cavity comprises an opening that opens into the first end surface.

8. The holder according to claim 7, wherein
a center of the cavity in a direction along the central axis is located closer to the first end than a center of the first member in the direction along the central axis.

9. The holder according to claim 7, further comprising:
a lid to close the opening.

10. The holder according to claim 1, wherein
the first protrusions and the first recesses are arranged alternatingly along the circumferential direction on the first surface,
the second protrusions and the second recesses are arranged alternatingly along the circumferential direction on the second surface,
each of the first protrusions is inserted into a corresponding second recess of the second recesses, and
each of the second protrusions is inserted into a corresponding first recess of the first recesses.

11. A cutting tool, comprising:
the holder according to claim 1, and
a cutting insert attached to the holder.

12. A method for manufacturing a machined product, comprising:
rotating at least one of the cutting tool according to claim 11 and a workpiece;
bringing the cutting tool into contact with the workpiece; and
moving the cutting tool away from the workpiece.

13. A holder, comprising:
a base having a bar shape extended from a first end to a second end along a central axis of the holder;
a first weight having a column shape extended from a first end part to a second end part;
a second weight having a column shape extended from a third end part to a fourth end part; and
at least one weight having a same configuration as the first weight or second weight, wherein
the base comprises a cavity located in the base and extended along the central axis,
the first weight is located in the cavity and comprises
a first surface facing the second weight, and
a first recess located on the first surface,
the second weight is located in the cavity and located closer to the second end than the first weight, and comprises
a second surface facing the first weight,
a protrusion located on the second surface,
a third surface located on a side opposite to the second surface along the central axis, and
a second recess located on the third surface, and
the at least one weight is located in the cavity and located closer to the second end than the second weight.

14. The holder according to claim 13, wherein
an entirety of the protrusion is located closer to the central axis than the first recess in a cross section which passes through the protrusion and the first recess and which is orthogonal to the central axis.

15. The holder according to the claim 13, wherein
the base further comprises a flow path located in the base and extended along the central axis,
the flow path connects to the cavity,
the first weight further comprises a first through hole that opens into the first end part and the second end part,
the second weight further comprises a second through hole that opens into the third end part and the fourth end part, and
the first through hole and the second through hole are located along the central axis.

16. The holder according to claim 13, wherein
the base further comprises
a first member comprising the cavity, and
a second member located closer to the first end than the first member,
the first member further comprises a first end surface located on a side of the first end,
the second member comprises a second end surface located on a side of the second end,
the first end surface and the second end surface are opposed to each other, and
the cavity comprises an opening that opens into the first end surface.

17. The holder according to claim 16, wherein
a center of the cavity in a direction along the central axis is located closer to the first end than a center of the first member in the direction along the central axis.

18. The holder according to claim 16, further comprising:
a lid to close the opening.

19. The holder according to claim 13, wherein
the first weight includes a plurality of first recesses including the first recess, wherein each of the plurality of first recesses is distanced from each other in a circumferential direction of the holder,
the second weight includes a plurality of protrusions including the protrusion, wherein each of the plurality of protrusions is distanced from each other in the circumferential direction, and each of the plurality of protrusions is inserted into a corresponding first recess of the plurality of first recesses.

* * * * *